United States Patent
Nakamura et al.

(10) Patent No.: US 6,963,374 B2
(45) Date of Patent: Nov. 8, 2005

(54) METHOD FOR LIVE VIEW DISPLAY AND DIGITAL CAMERA USING SAME

(75) Inventors: Kenji Nakamura, Takatsuki (JP); Yasuhiro Morimoto, Takatsuki (JP); Hiroaki Kubo, Muko (JP); Hitoshi Yano, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 916 days.

(21) Appl. No.: 09/790,470

(22) Filed: Feb. 22, 2001

(65) Prior Publication Data

US 2001/0019362 A1 Sep. 6, 2001

(30) Foreign Application Priority Data

Feb. 22, 2000 (JP) ........................................ 2000-044471

(51) Int. Cl.⁷ ........................ H04N 5/222; H04N 5/225; H04N 5/76; G06F 3/00; G06F 13/00
(52) U.S. Cl. .......................... 348/333.11; 348/220.1; 348/231.99; 710/40; 711/151
(58) Field of Search ................. 348/333.01, 333.11, 348/333.12, 333.13, 220.1, 222.1, 231.6, 231.99, 231.9; 345/535, 534, 547; 710/22, 23, 28, 40, 41; 711/151; 386/108

(56) References Cited

U.S. PATENT DOCUMENTS

| | | | |
|---|---|---|---|
| 5,867,214 A | * | 2/1999 | Anderson et al. ........ 348/231.6 |
| 6,130,710 A | * | 10/2000 | Yasuda ..................... 348/220.1 |
| 6,137,534 A | * | 10/2000 | Anderson ................ 348/333.01 |
| 6,148,031 A | * | 11/2000 | Kato ........................ 348/220.1 |
| 6,177,956 B1 | * | 1/2001 | Anderson et al. ...... 348/207.99 |
| 6,243,531 B1 | * | 6/2001 | Takeuchi et al. ............ 386/108 |
| 6,292,218 B1 | * | 9/2001 | Parulski et al. .......... 348/220.1 |
| 6,512,548 B1 | * | 1/2003 | Anderson ............... 348/333.11 |
| 6,642,956 B1 | * | 11/2003 | Safai ....................... 348/222.1 |
| 6,674,467 B1 | * | 1/2004 | Lee ........................ 348/333.11 |
| 6,753,916 B2 | * | 6/2004 | Saito ...................... 348/333.01 |
| 6,816,192 B1 | * | 11/2004 | Nishikawa ............. 348/231.99 |

(Continued)

FOREIGN PATENT DOCUMENTS

| | | | |
|---|---|---|---|
| EP | 0 683 596 A2 | 11/1995 | |
| EP | 0 975 155 A2 | 1/2000 | |
| JP | 09-205611 A | 8/1997 | |
| JP | 09307850 A | * 11/1997 | ............ H04N/5/91 |
| JP | 11055617 A | * 2/1999 | ............ H04N/5/91 |
| JP | 11-308560 A | 11/1999 | |
| JP | 11313239 A | * 11/1999 | ............ H04N/5/21 |
| JP | 11-331744 A | 11/1999 | |
| WO | WO 99/03263 A1 | 1/1999 | |

OTHER PUBLICATIONS

Japanese "Notification of Reason(s) for Refusal", dated May 24, 2005, for counterpart Japanese Patent Application No. 2000–044471, along with an English–translation thereof.

*Primary Examiner*—Wendy R. Garber
*Assistant Examiner*—John M. Villecco
(74) *Attorney, Agent, or Firm*—Sidley Austin Brown & Wood LLP

(57) ABSTRACT

Digital camera techniques improve the convenience of a live view display and the like. Image processing in a digital camera includes image processing (i.e., live view processing) for real-time display of a subject on a liquid crystal monitor and image processing performed on image signals followed by image capture for recording. Both the image processing is performed by a single common image processor. In image capture for recording, high-priority live view processing (Pc) is performed between writing (Pa) of image signals outputted from a CCD into memory and captured image processing (Pb). This shortens the time of not displaying a live view image, thereby preventing a shutter release opportunity from being missed and improving the convenience of a live view display.

27 Claims, 14 Drawing Sheets

U.S. PATENT DOCUMENTS

| | | | | |
|---|---|---|---|---|
| 2002/0003574 A1 | * | 1/2002 | Kawamura | 348/222 |
| 2002/0196348 A1 | * | 12/2002 | Kubo | 348/220.1 |
| 2003/0090585 A1 | * | 5/2003 | Anderson | 348/333.11 |
| 2003/0112340 A1 | * | 6/2003 | Okada et al. | 348/220.1 |
| 2003/0117513 A1 | * | 6/2003 | Anderson | 348/333.11 |
| 2003/0122952 A1 | * | 7/2003 | Kuroiwa | 348/333.11 |
| 2003/0160874 A1 | * | 8/2003 | Kuroiwa | 348/220.1 |
| 2004/0179116 A1 | * | 9/2004 | Stavely et al. | 348/231.99 |
| 2004/0227836 A1 | * | 11/2004 | Tanaka | 348/333.11 |
| 2004/0246360 A1 | * | 12/2004 | Stavely et al. | 348/333.11 |

* cited by examiner

METHOD FOR LIVE VIEW DISPLAY AND DIGITAL CAMERA USING SAME

This application is based on application No. 2000-44471 filed in Japan, the contents of which are hereby incorporated by reference.

BACKGROUND OF THE INVENTION

1. Field of the Invention

The present invention relates to digital camera techniques and especially to improvements in the convenience of a live view display and the like.

2. Description of the Background Art

On release of the shutter, conventional digital cameras stop a live view display, i.e., a real-time display of a subject on a monitor, and perform image processing for image recording which is followed by the shutter release, then perform image processing for live view display after the completion of the image processing for recording.

Because all the image processing is conducted by a single image processor, a user cannot visually identify a live view image for a while after a shutter release until the image processing for recording is completed.

FIG. 15 shows an example of a sequence of operations of the conventional digital cameras.

After a shutter release operation, i.e., a full press of the shutter release button, a time Ta for exposure and storage in a CCD, a time Tb to read out image data stored in the CCD, correct the black level and the like of the image data, and write resultant raw data into memory, and a time Tc for the aforementioned image processing become necessary. During those times or a total time Td (=Ta+Tb+Tc), a live view display is not produced.

An image pickup device with approximately one-million-pixel resolution requires a relatively short time of image processing. Thus, not displaying a live view image during the image processing is felt quite normal by a user without a hitch.

However, a digital camera having an image pickup device with approximately five- to six-million pixel resolution has large amounts of data to be processed. In this case, it can be predicted that the time during which a user cannot visually recognize a live view display will increase. Such an increase in the time of not displaying a live view image may cause problems such as missing a shutter release opportunity, impairing the convenience of the digital camera because of unpleasantness in framing during image capture, and the like.

SUMMARY OF THE INVENTION

The present invention is directed to a digital camera.

The digital camera of the present invention comprises: an image sensor capable of selectively generating a first image signal and a second image signal; a memory for storing the second image signal; an image processor for performing first image processing on the first image signal and for performing second image processing, which is lower in priority than the first image processing, on the second image signal; and a timing controller for storing the second image signal generated by the image sensor into the memory at a first timed instant, for supplying the first image signal generated by the image sensor to the image processor at a second timed instant after the first timed instant, and for reading out and supplying the second image signal stored in the memory to the image processor at a third timed instant after the second timed instant. Therefore, the image processing on the first image signal can be performed preferentially, which improves the convenience of a live view display and the like.

In a preferred embodiment of the present invention, the second image signal in the digital camera is an image signal for recording. Thus, the image processing for recording, which does not have to be performed quickly, can be postponed.

Moreover, the present invention is also directed to a computer-readable recording medium.

An object of the present invention is therefore to provide digital camera techniques that improve the convenience of a live view display and the like.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

<Main Construction of Digital Camera>

Figure 1:
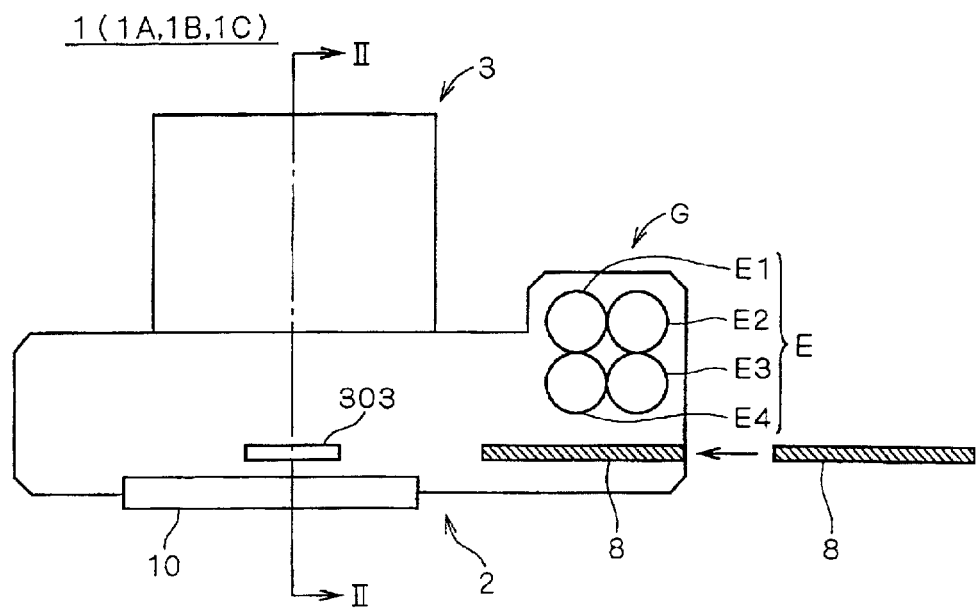
FIGS. 1 to 3 show a main construction of a digital camera 1 according to a first preferred embodiment of the present invention.
Figure 2:
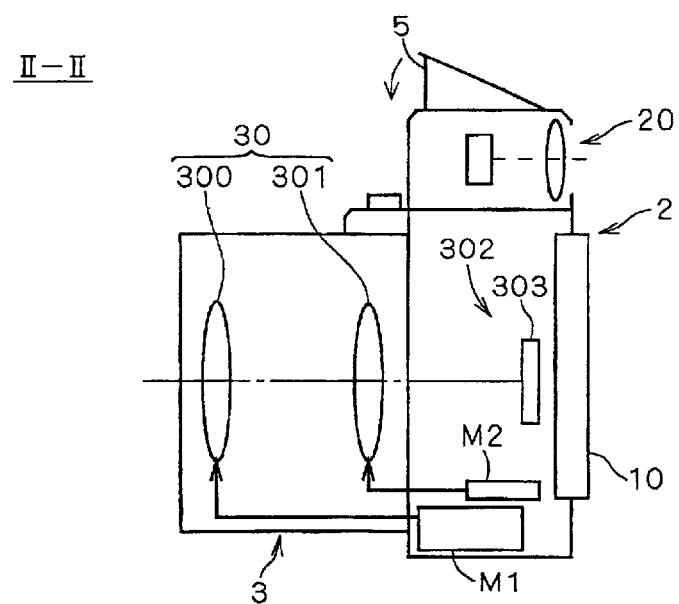
Figure 3:
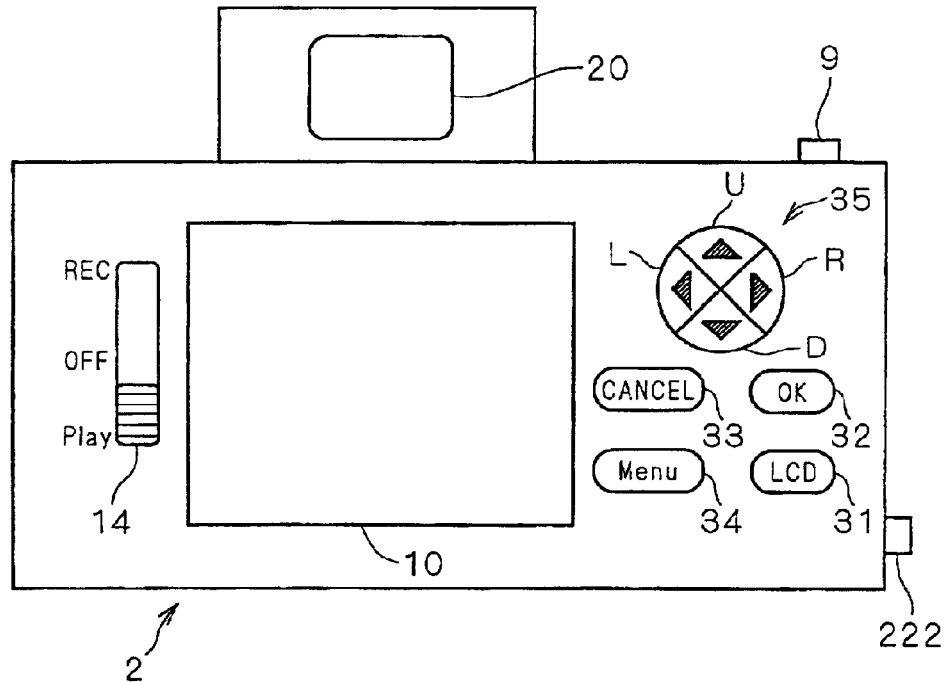

FIGS. 1 through 3 show a main construction of a digital camera 1 according to a first preferred embodiment of the present invention. FIG. 1 is a plan view, FIG. 2 is a cross-sectional view taken along the line II—II of FIG. 1, and FIG. 3 is a rear view. These figures are not necessarily drawn based on the third angle projection, but are intended to conceptually illustrate the main construction of the digital camera 1. This digital camera 1 is common to each of the following preferred embodiments.

As shown in FIGS. 1 to 3, the digital camera 1 has the shape of a general rectangular parallelepiped.

An image capturing circuit 302 having a CCD color area sensor 303 is provided in position behind a lens group 30 with macro capability serving as taking lenses. The lens group 30 includes a zoom lens 300 and a focusing lens 301.

A camera body 2 comprises a zoom motor M1 for changing the zoom ratio of the zoom lens 300 and a motor M2 for driving the focusing lens 301 to achieve focus.

The front surface of the camera body 2 is provided with a grip G. A pop-up built-in flash 5 is provided in position in an upper end part of the camera body 2. A shutter release button 9 is provided on the upper surface of the camera body 2. The shutter release button 9 has the function of detecting and judging between its half-pressed position at which it serves as a trigger for focus adjustment and its full-pressed position at which it serves as a trigger for image capture for recording.

Referring to FIG. 3, the rear surface of the camera body 2 has a liquid crystal display (LCD) 10 and an electronic viewfinder (EVF) 20 both for a live view display of a captured image, a playback of a recorded image, and the like. Unlike an optical viewfinder, the LCD 10 and the EVF 20, both using image signals from the CCD 303 for display, play a role as a viewfinder.

The rear surface of the camera body 2 also has a recording/playback mode selection switch 14 for selection between a recording mode and a playback mode. The recording mode is the mode of picture taking, and the playback mode is the mode of playing back and displaying on the LCD 10 captured images recorded on a memory card 8.

A crossed switch 35 with buttons U, D, L and R is provided in a right-hand position on the rear surface of the digital camera 1. Pressing the buttons L and R drives the zoom motor M1 for zooming. The buttons U, D, L and R are used for various operations.

An LCD button 31, an OK button 32, a cancel button 33 and a menu button 34 are provided on the rear surface of the camera body 2.

The camera body 2 has an external monitor terminal 222 on the side surface. The external monitor terminal 222 is a terminal for transmitting image data and the like from the digital camera 1 to an external monitor.

As illustrated in FIG. 1, the digital camera 1 is capable of loading the memory card 8. The digital camera 1 is driven by a power battery E having four in-series connected AA cells E1 to E4.

<Functional Blocks of Digital Camera 1>

Figure 4:
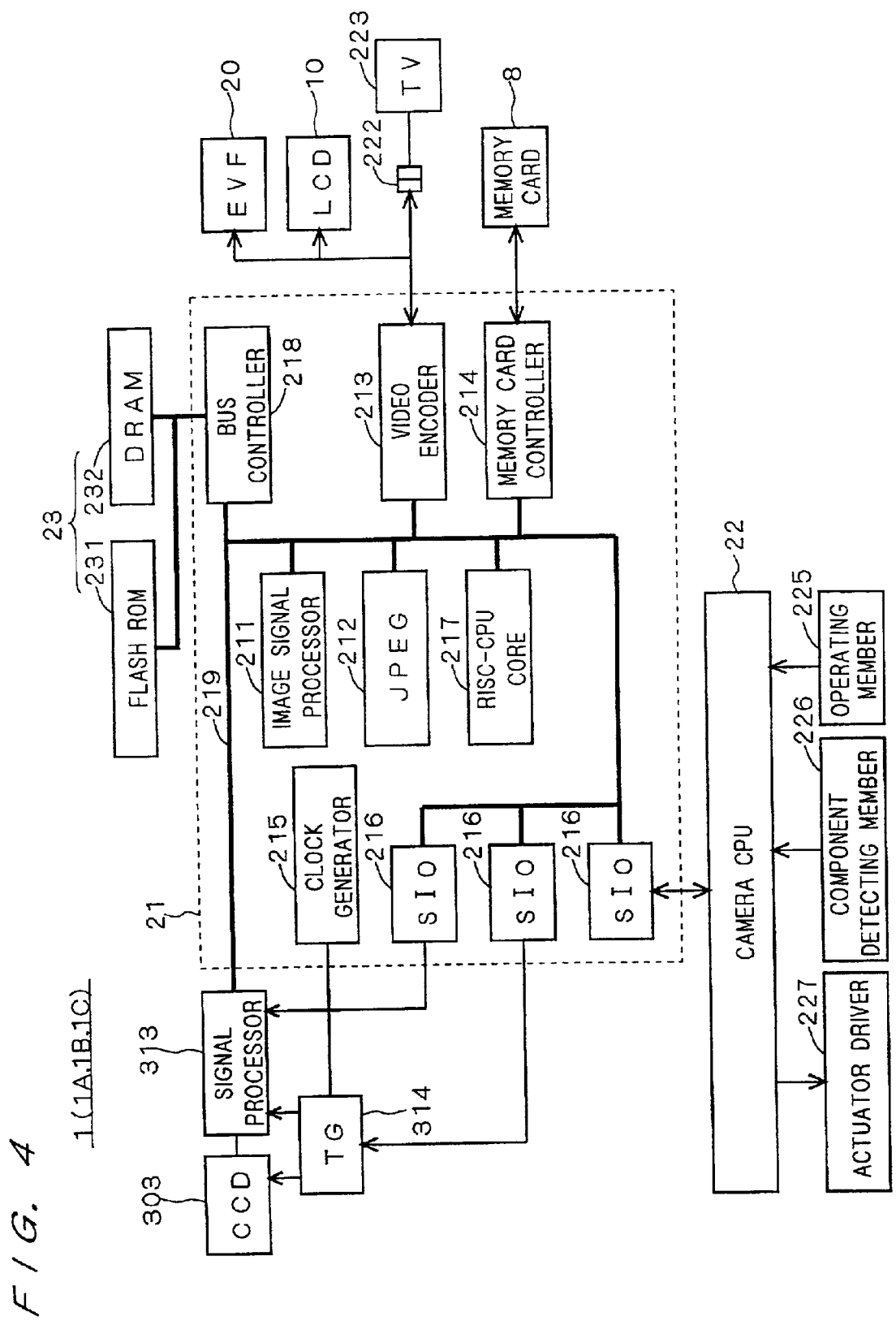
FIG. 4 is a functional block diagram of the digital camera 1.

FIG. 4 is a functional block diagram of the digital camera 1.

The CCD 303 changes an optical subject image, which is formed by the lens group 30, by photoelectric conversion into an image signal having R (red), G (green) and B (blue) color components (i.e., into a signal comprised of a sequence of pixel signals received at respective pixels) for output. The interline CCD 303 has 2,000 horizontal pixels and 1,500 vertical pixels, i.e., provides a three-million-pixel resolution. For readout of all pixels, 750 lines each are read out at two different times.

A signal processor 313, by using a CDS (correlated double sampling) circuit and an A/D converter for converting an output of the CCD 303 into digital image data format, transfers digital image data to a CPU for digital camera (hereinafter referred to as "a main CPU") 21.

A timing generator (TG) 314 generates various timing pulses for controlling the drive of the CCD 303. It also has the function of changing the types of image signals outputted from the CCD 303.

The main CPU 21 is in the form of a single chip on which necessary functions for the digital camera are implemented. The main CPU 21 comprises an image signal processor 211, a JPEG section 212, and a video encoder 213. It further comprises a memory card controller 214, a clock generator 215, SIOs (clock serial interfaces) 216, a RISC-CPU core 217 for controlling each section, and a bus controller 218.

The image signal processor 211 performs processing such as color space conversion into YCrCb data (which will later be described in detail).

The JPEG section 212 has the functions of compressing image data processed by the image signal processor 211 and expanding image data fetched from the memory card 8 both in the JPEG format.

The video encoder 213 processes image data generated by the image signal processor 211 and converts resultant image data into digital composite signals that conform to a television-style format such as NTSC or PAL, then into analog composite signals by a D/A converter.

The memory card controller 214 inputs and outputs image data from and to the memory card 8.

The clock generator 215 sends out clocks to the TG 314.

The SIOs 216 make data transfer for controlling the signal processor 313, the TG 314, and a camera CPU 22.

The bus controller 218 controls input/output data from/to external memory 23 over a bus 219. It also severs as a DMA (direct memory access) controller.

The external memory 23 is comprised of a flash ROM 231 for storing program data and a volatile DRAM 232 for accumulating image data or the like. The flash ROM 231 is capable of storing program data recorded on the memory card or recording medium 8 through the memory card controller 214. The program data stored can be reflected in the operation of the digital camera 1. A control program to be described later can also be installed in the digital camera 1 from the memory card 8.

The camera CPU 22 controls the operation of the digital camera 1. That is, the camera CPU 22 performs a camera sequence, being connected to a user-operated operating member 225 such as the shutter release button 9, a component detecting member 226 for detecting the positions of mechanisms such as the lens group 30, and an actuator driver 227 for driving actuators such as the zoom motor M1.

Figure 5:
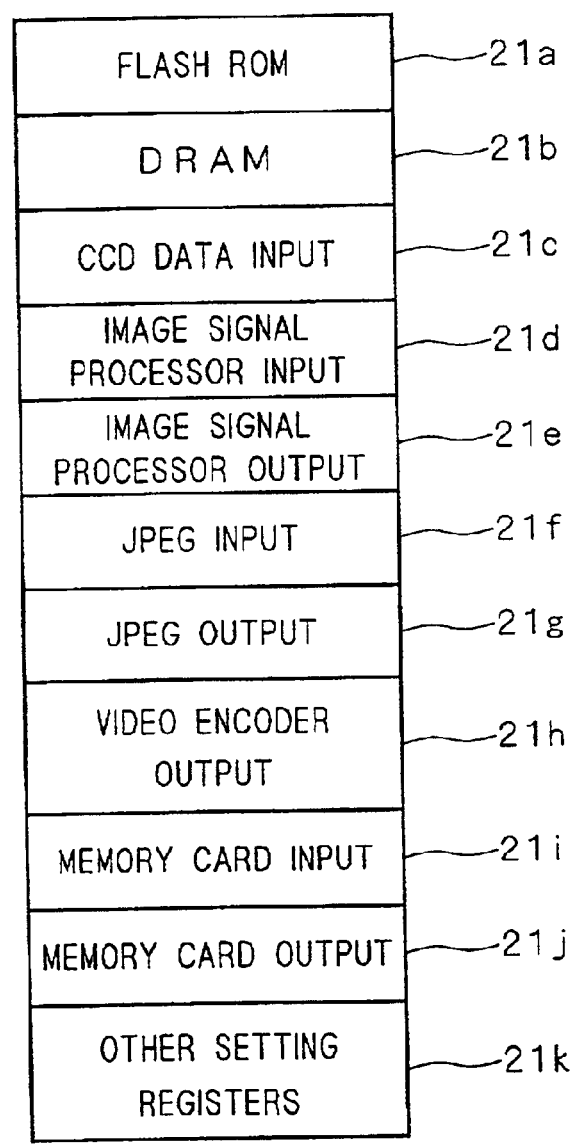
FIG. 5 shows mapping in main storage space in a main CPU 21.

FIG. 5 shows mapping in main storage space in the main CPU 21.

An area 21a for flash ROM is for storage of a control program of the main CPU 21. At power-on, the program code is executed from beginning.

An area 21b for DRAM is for storage of program work data or image data being processed before written into the memory card 8. The area 21b has storage capacity of a plurality of images.

An area 21c for data input from the CCD 303 is for writing of data outputted from the signal processor 313.

Areas 21d and 21e for image signal processor input/output are for image processing such as color space conversion into YCrCb.

Areas 21f and 21g for JPEG input/output are for JPEG image compression/expansion.

An area 21h for video encoder output is for writing of digital composite data generated by image signal processing.

An area 21i for memory card input is for readout of data from the memory card 8, and an area 21j for memory card output is for writing of data to the memory card 8.

An area 21k for other setting registers is for setting of internal storage resources in the main CPU 21.

Now, data transfer in the main CPU 21 will be described.

In the main CPU 21, the use of the function of the bus controller 218 as a DMA controller allows direct data transfer between each module for which a DMA channel is set up and the DRAM 232. The settings of the DMA channels are as follows:

(1) DMA channel 1: image signal processor to DRAM;
(2) DMA channel 2: DRAM to image signal processor;
(3) DMA channel 3: image signal processor to DRAM;
(4) DMA channel 4: DRAM to JPEG section;
(5) DMA channel 5: JPEG section to DRAM;
(6) DMA channel 6: DRAM to video encoder;
(7) DMA channel 7: DRAM to memory card controller; and
(8) DMA channel 8: memory card controller to DRAM.

For data transfer control by DMA, an enabling bit of a DMA setting register in the main CPU 21 is first enabled and data to be transferred by each module is generated. On a DMA transfer request to the bus controller 218, the bus controller 218 judges priorities in DMA and starts DMA. Once DMA is started, data can be transferred between each module and the DRAM 232 without software intervention. The bus controller 218 also conducts arbitration of the bus 219 for each predetermined number of bytes, thereby to arbitrate between each of other DMA requests.

In this arbitration, if the data input from the CCD 303 and the output to the video encoder 213 are assigned the highest priority in DMA, data transfers over these two channels take priority over the other DMA requests. The other DMA channels are given the same priority, and when the arbitration is required, modules which have been executed are in turn assigned the lowest priority in a round-robin fashion so that these modules are executed in sequence.

The flow of image processing in such a digital camera 1 will now be described.

<Flow of Image Processing in Main CPU 21>

Figure 6:
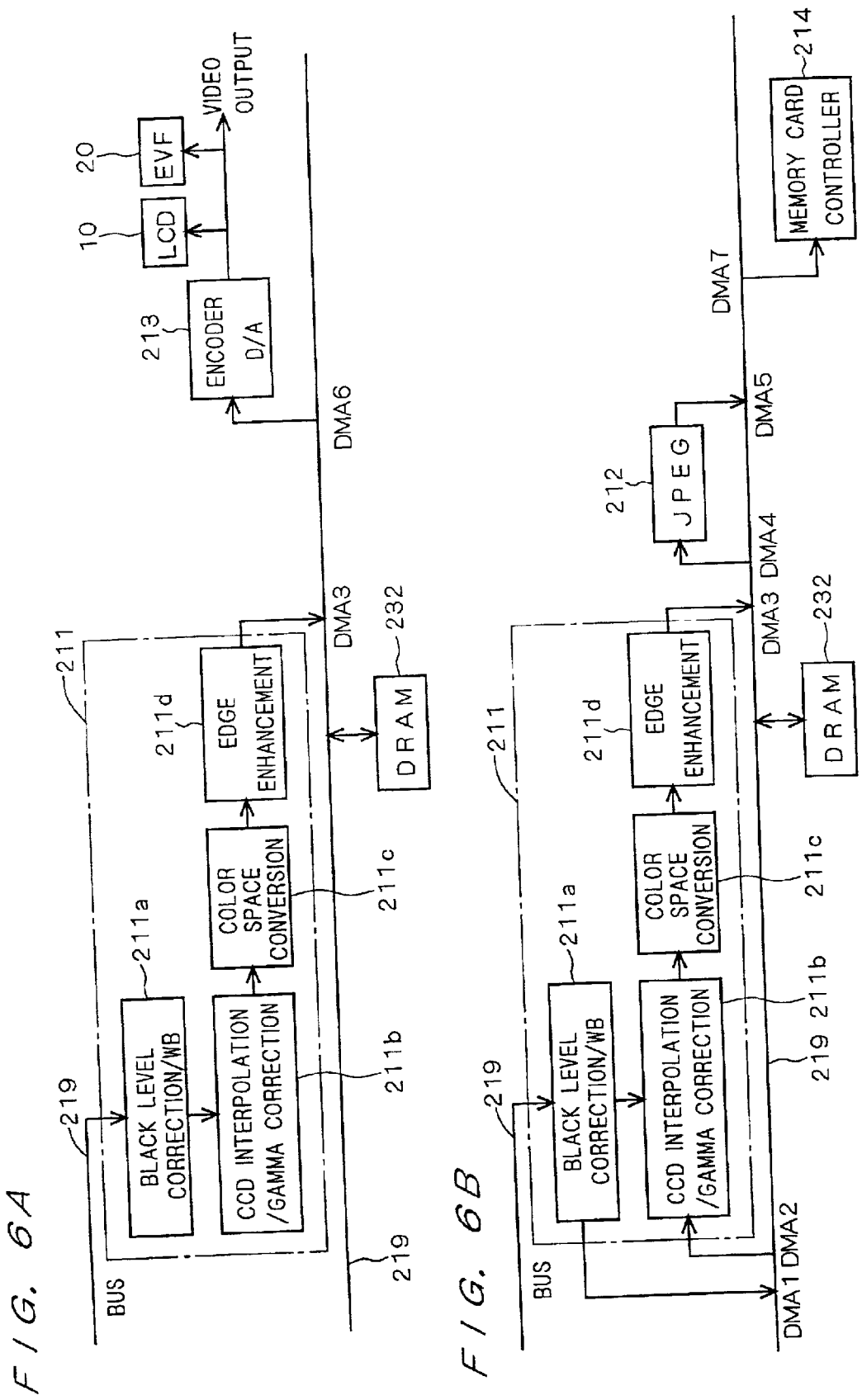
FIGS. 6A and 6B are flow diagrams of image processing in the main CPU 21.

FIGS. 6A and 6B are flow diagrams of image processing in the main CPU 21 utilizing the above DMA. FIG. 6A shows the flow of image processing for live view display, and FIG. 6B shows the flow of image processing for acquisition of an image for recording followed by a full press of the shutter release button 9.

In the image processing for live view display, for display of 30 frames per second on the LCD 10 and the EVF 20, a draft mode of reading out one line for every five vertical lines of pixels by means of subsampling is adopted in a method of reading out captured image data from the CCD 303. This permits fivefold scanning speed, i.e., 30-frame-per-second readout, as compared with an all pixel readout method that permits only 6-frame-per-second readout.

The main CPU 21 exercises control over the TG 314 through one of the SIOs 216 so that the setting of the TG 314 is adjusted to clock generation for 30-frame-per-second live view display. At this time, the main CPU 21 enables the DMA channel 3 for output from the image signal processor 211 and the DMA channel 6 for video encoder output. Then, image data as a first image signal, which is outputted from the CCD 303 at 30 frames per second, enters in sequence at the image signal processor 211, where the image data goes through a processing part 211a for black level correction and white balance control and a processing part 211b for gamma correction and interpolation to generate RGB data from CCD Bayerdata, and is converted into YCrCb in a color space conversion part 211c. Then, edge enhancement of the Y signal is performed in an edge enhancement part 211d, the result of which is written into the DRAM 232 over the DMA channel 3. The image data written into the DRAM 232 is transferred over the DMA channel 6 to the video encoder 213, which then generates and outputs composite video signals for image display on the LCD 10, the EVF 20, and the like. The timing of readout from the DRAM 232 by the video encoder 213 over the DMA channel 6 is in synchronization with a synchronization signal for driving the LCD 10. At this time, such a horizontal resolution of pixels as in the image data is unnecessary for display on the LCD 10 and the like; therefore, approximately 640 horizontal pixels are read out by subsampling. As described so far, live view processing and display are performed in this fashion.

Next, the flow of image processing for acquisition of an image for recording is discussed. On a request for acquisition of an image for recording from the camera CPU 22, the main CPU 21 adjusts the setting of each module for acquisition of an image for recording. That is, the DMA channels 1 to 7 are enabled and the main CPU 21 exercises control over the TG 314 through one of the SIOs 216 so that the setting of the TG 314 is adjusted to clock generation for acquisition of an image for recording and an electronic shutter speed of the CCD 303 is set as requested by the camera CPU 22. Then, image data as a second image signal accumulated in the CCD 303 is subjected to image processing by the black level correction/white balance control part 211a in the image signal processor 211 and is written as raw data (raw image data) to the DRAM 232 over the DMA channel 1 in two parts at two different times. After the writing to the DRAM 232 is complete, the completion of readout by the CCD 303 is detected and the data written into the DRAM 232 is again read out by the image signal processor 211 over the DMA channel 2. In the image signal processor 211, the processing part 211b for interpolation and gamma correction, the color space conversion part 211c, and the edge enhancement part 211d perform image processing as is the case for live view display, and resultant YCrCb image data is written again into the DRAM 232 over the DMA channel 3. After all image data is written into the DRAM 232, the JPEG section 212 reads out the data over the DMA channel 4 and performs JPEG compression. The JPEG section 212 then writes the result of JPEG compression into the DRAM 232 over the DMA channel 5. The DRAM 232 has arranged therein JPEG data obtained through image compression and transfers the same to the memory card controller 214 over the DMA channel 7 to create a file in the memory card 8. As described so far, the image processing for acquisition of an image for recording is performed in this fashion.

The image processing (filtering process) by the image signal processor 211 is common to both the aforementioned live view processing and the processing for acquisition of an image for recording, but the image processing (image compression for recording) by the JPEG section 212 is peculiar to the processing for acquisition of an image for recording.

<Operation of Digital Camera 1>

Figure 7:
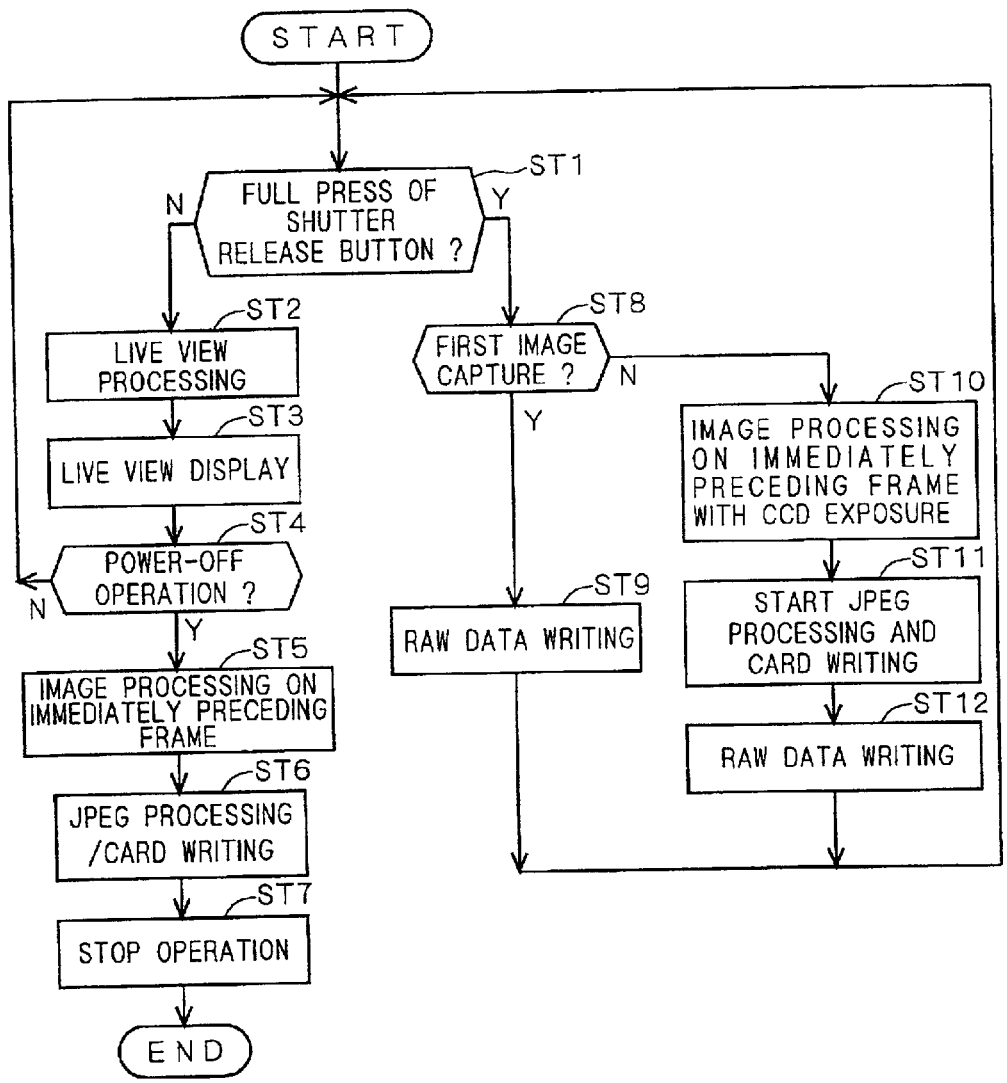
FIG. 7 is a flow chart of the operation of the digital camera 1.
Figure 8:
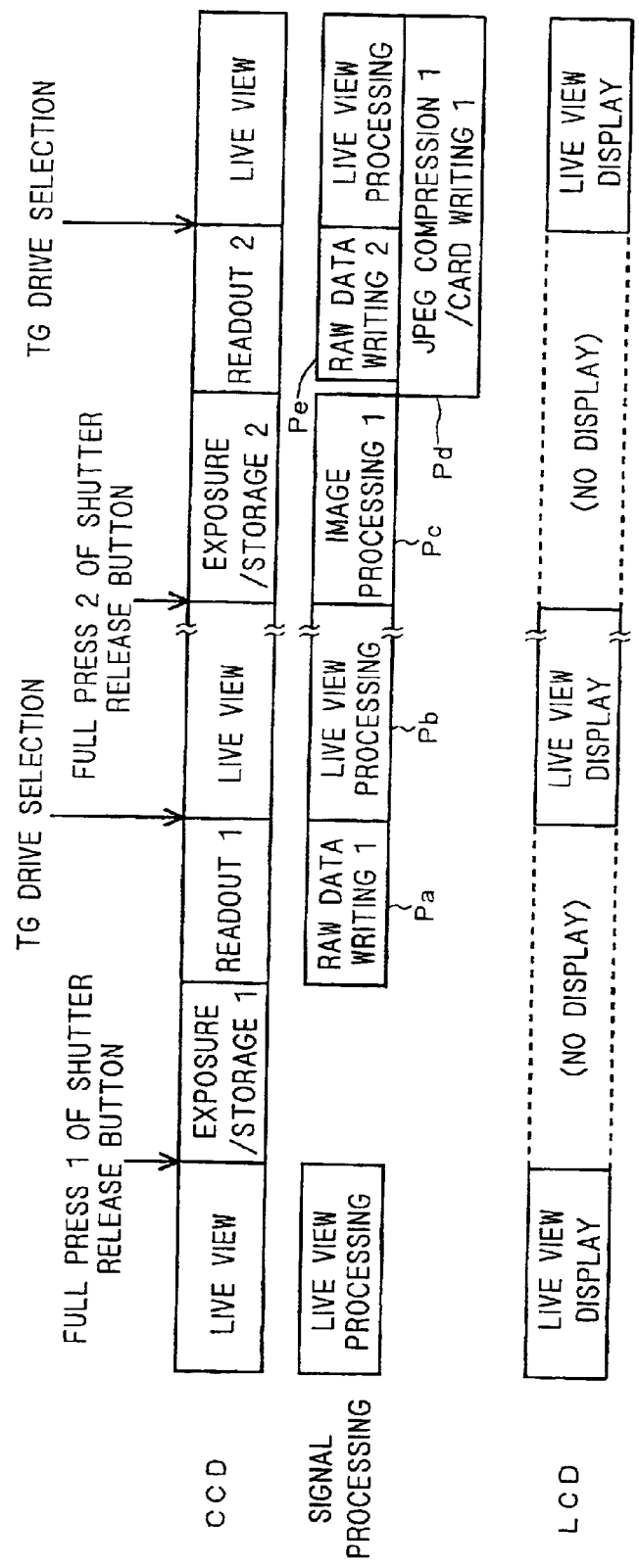
FIG. 8 shows an example of a sequence of operations of the digital camera 1.

FIG. 7 is a flow chart of the operation of the digital camera 1. FIG. 8 shows an example of a sequence of operations of the digital camera 1.

When the digital camera 1 is switched on, whether the shutter release button 9 is fully pressed or not, i.e., an operation to acquire an image for recording is performed or not, is determined (step ST1). With a full press of the shutter release button 9, the process goes to step ST8. Otherwise, the process goes to step ST2.

In step ST2, live view processing is performed. In step ST3, image data obtained through the live view processing is displayed on the LCD 10 and the EVF 20.

In step ST4, whether or not the mode selection switch 14 is used for a power-off operation is determined. When the power-off operation is performed, the process goes to step ST5. Otherwise, the process returns to step ST1.

In step ST5, image processing is performed by the image signal processor 211 on a frame of image captured just before the power-off operation.

In step ST6, image compression is performed by the JPEG section 212 and resultant image data is recorded on the memory card 8 through the memory card controller 214.

In step ST7, a stop operation of the digital camera 1 such as actually turning off the power is performed.

In step ST8, whether or not the operation is an initial image capture, i.e., a first image capture operation after power-on, is determined. In the case of the initial image capture, the process goes to step ST9. Otherwise, the process goes to step ST10.

In step ST9, raw data processed by the black level correction/white balance control part 211a is written into the DRAM 232 over the DMA channel 1 (cf. an operation Pa of FIG. 8). During the processing of step S9, a live view display is not produced, but if a full press of the shutter release button 9 is not detected in the subsequent step ST1, the TG 314 is switched to the drive for live view display and live view processing (cf. an operation Pb of FIG. 8) is performed to resume a live view display.

In step ST10, a frame of raw data obtained by an immediately preceding image capture and stored in the DRAM 232 is read out over the DMA channel 2 and is subjected to image processing such as color space conversion in the image signal processor 211. This image processing, as indicated by the operation Pc of FIG. 8, is performed by utilizing the time for exposure and storage in the CCD 303, i.e., the time during which a live view display is not produced. This allows the effective use of a non-live-view-display state.

Step ST11 starts image compression by the JPEG section 212 using the DMA channels 4 and 5, and recording of image data on the memory card 8 through the memory card controller 214 using the DMA channel 7 (cf. an operation Pd of FIG. 8). This processing does not use the image signal processor 211 and thus has no influence over a live view display.

In step ST12, as in step ST9, raw data processed by the black level correction/white balance control part 211a is written into the DRAM 232 over the DMA channel 1 (cf. an operation Pe of FIG. 8). Although both the operations Pd and Pe require access to the DRAM 232 utilizing DMA, the arbitration by the bus controller 218 allows alternate access by these operations; therefore, outwardly, the operations Pd and Pe are performed concurrently. A higher bus band of the DRAM 232 permits smoother arbitration.

The operations described so far allow a live view display to be resumed immediately after raw data is written into the DRAM 232. This makes the time of not displaying a live view image in obtaining an image for recording shorter than before. Consequently, framing for the next image capture can be provided to a user, which improves the convenience of a live view display.

Second Preferred Embodiment

A digital camera 1A according to a second preferred embodiment of the present invention differs from the digital camera 1 of the first preferred embodiment in program data stored in the flash ROM 231. Hereinafter, the operation of the digital camera 1A will be described.
<Operation of Digital Camera 1A>

Figure 9:
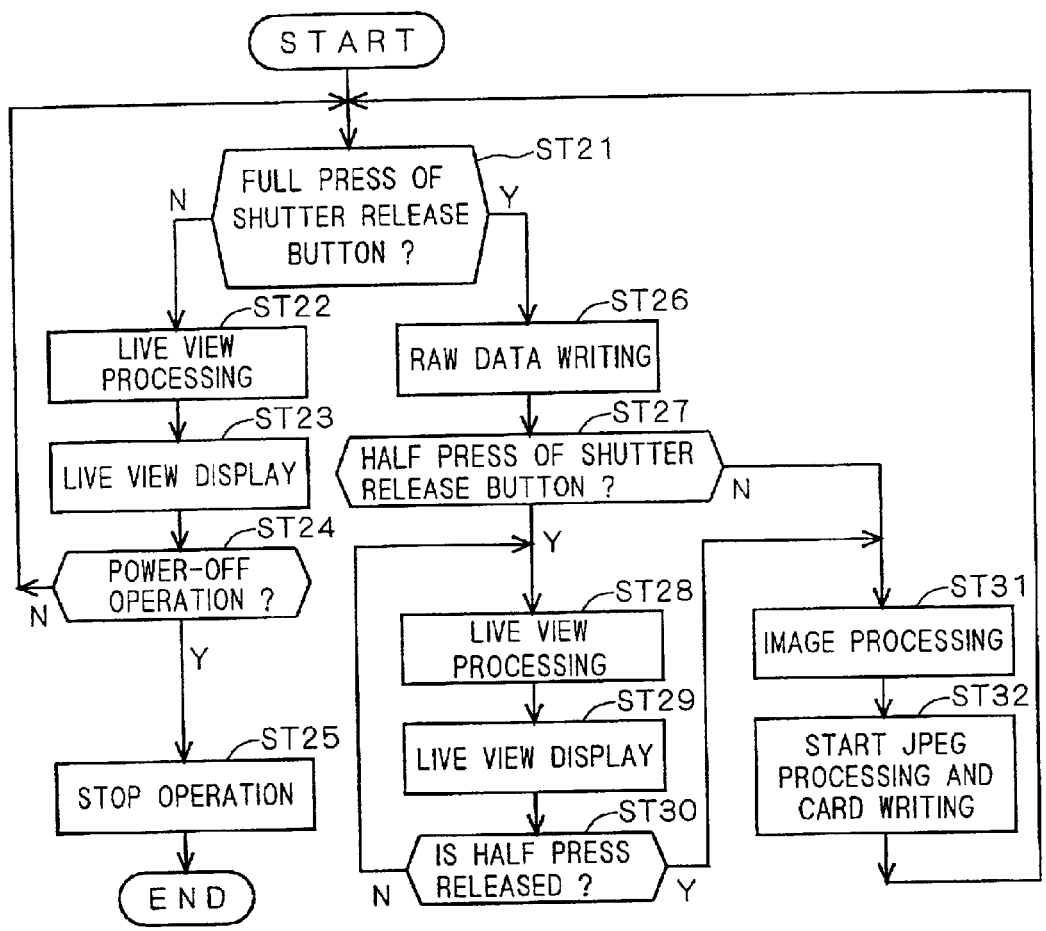
FIG. 9 is a flow chart of the operation of a digital camera 1A.
Figure 10:
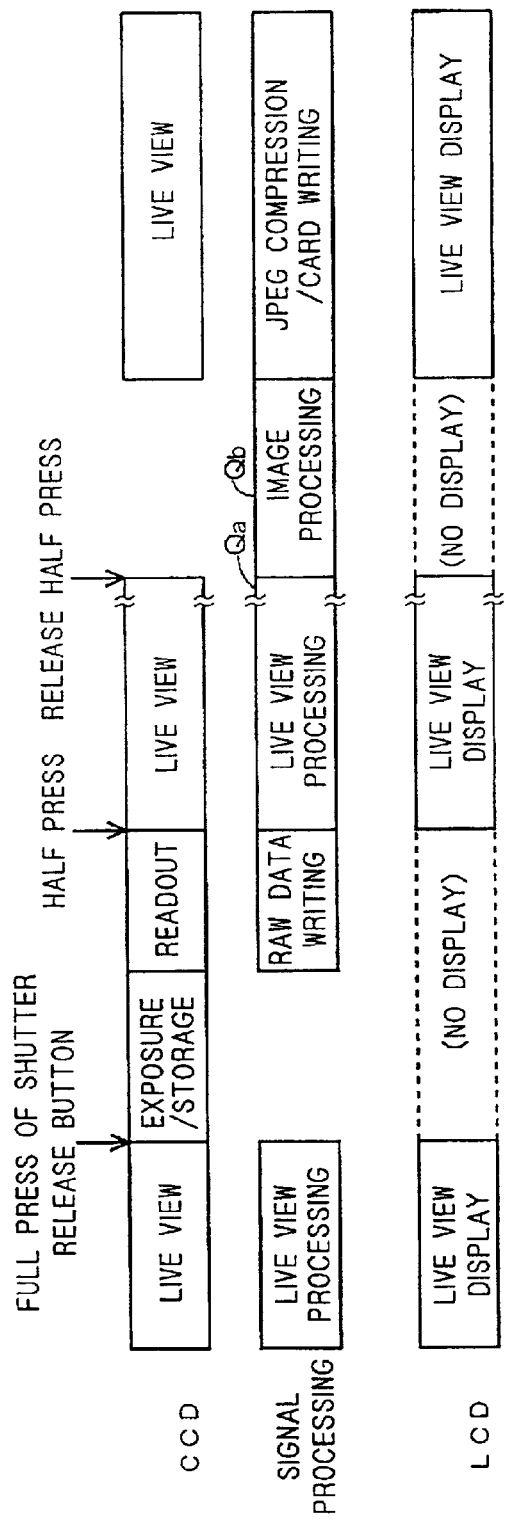
FIG. 10 shows an example of a sequence of operations of the digital camera 1A.

FIG. 9 is a flow chart of the operation of the digital camera 1A. FIG. 10 shows an example of a sequence of operations of the digital camera 1A.

In step ST21, whether or not the shutter release button 9 is fully pressed is determined. With a full press of the shutter release button 9, the process goes to step ST26. Otherwise, the process goes to step ST22.

In steps ST22 and ST23, live view processing and display are performed as in steps ST2 and ST3 shown in the flow chart of FIG. 7.

In step ST24, whether or not the mode selection switch 14 is used for a power-off operation is determined. When the power-off operation is performed, the process goes to step ST25.

In step ST25, a stop operation of the digital camera 1A such as actually turning off the power is performed.

In step ST26, raw data processed by the black level correction/white balance control part 211a is written into the DRAM 232 over the DMA channel 1.

In step ST27, whether or not the shutter release button 9 is pressed halfway down is determined. With a half press of the shutter release button 9, the process goes to step ST28. Otherwise, the process goes to step ST31.

In steps ST28 and ST29, the same processing as in steps ST22 and ST23 is performed. Here, it is assumed that a user intends to continue photographing; therefore, live view display is produced preferentially as indicated by an operation Qa of FIG. 10. This prevents a shutter release opportunity from being missed.

In step ST30, whether the half-pressed position of the shutter release button 9 is released or not, i.e., a user releases the shutter release button 9 or not, is determined. When the half-pressed position is released, the process goes to step ST31 for image processing (cf. an operation Qb of FIG. 10). Otherwise, the process returns to step ST28.

In step ST31, a frame of raw data obtained by an immediately preceding image capture and stored in the DRAM 232 is read out over the DMA channel 2 and subjected to image processing such as color space conversion in the image signal processor 211.

Step ST32 starts image compression by the JPEG section 212 and recording of image data on the memory card 8 through the memory card controller 214.

In the operation described so far, a live view display is produced preferentially if the shutter release button 9 is in its half-pressed position when raw data is written into the DRAM 232. This allows a live view display to be produced while a user is giving advance notice of photographing, thereby preventing, as appropriate, a shutter release opportunity from being missed. Consequently, the convenience of the digital camera 1A is improved.

Third Preferred Embodiment

A digital camera 1B according to a third preferred embodiment of the present invention differs from the digital camera 1 of the first preferred embodiment in program data stored in the flash ROM 231. Hereinafter, the operation of the digital camera 1B will be described.
<Operation of Digital Camera 1B>

Figure 11:
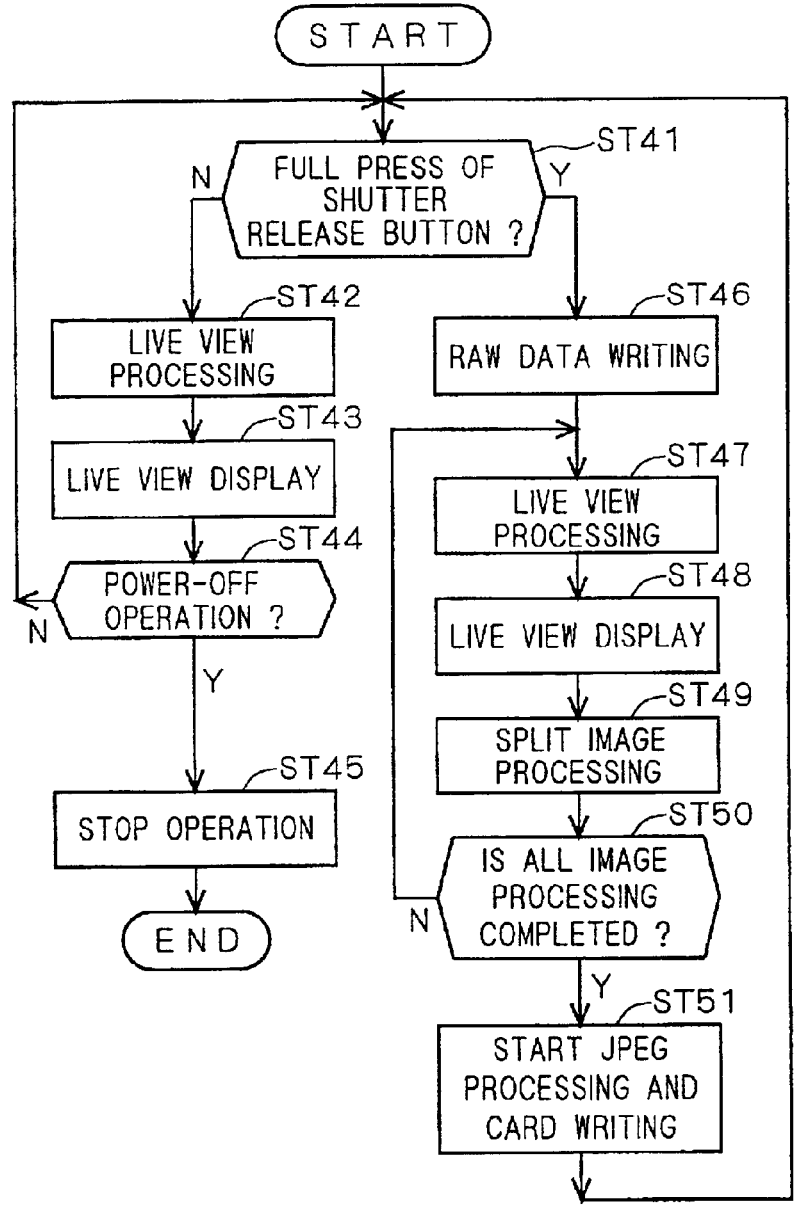
FIG. 11 is a flow chart of the operation of a digital camera 1B.
Figure 12:
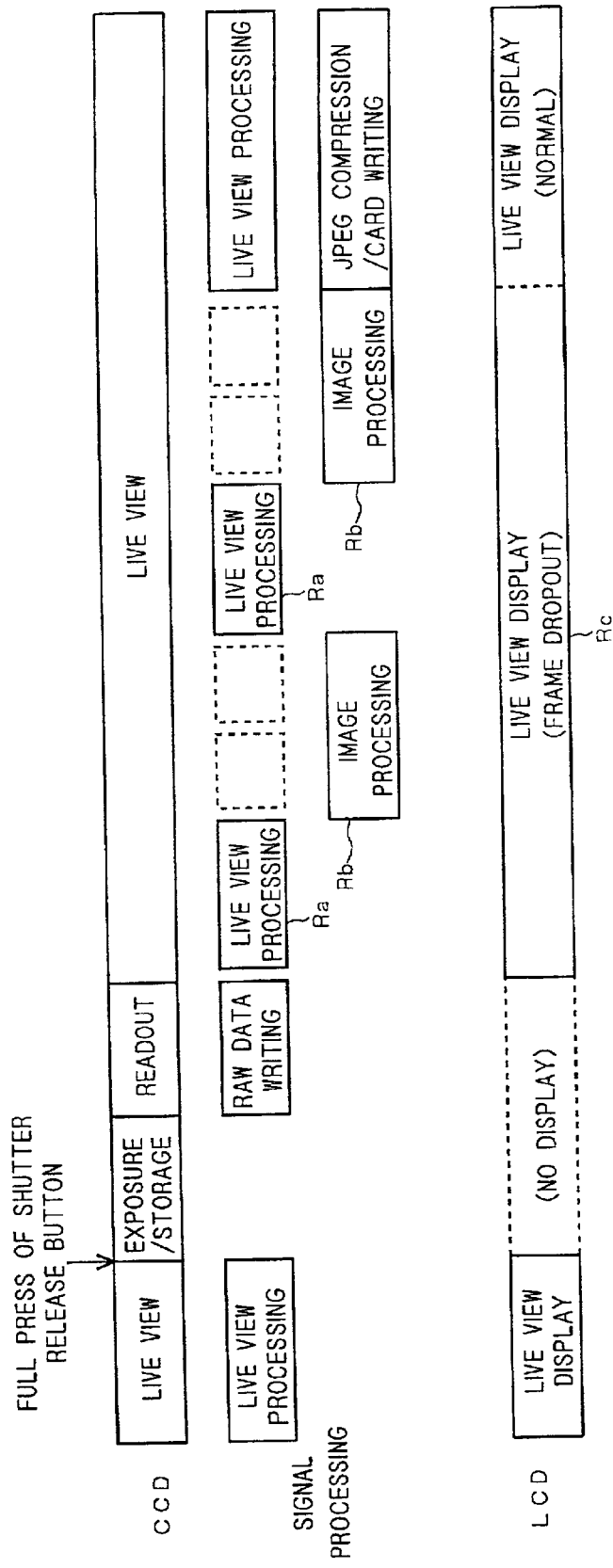
FIG. 12 shows an example of a sequence of operations of the digital camera 1B.

FIG. 11 is a flow chart of the operation of the digital camera 1B. FIG. 12 shows an example of a sequence of operations of the digital camera 1B.

In step ST41, whether the shutter release button 9 is fully pressed or not, i.e., an operation to acquire an image for recording is performed or not, is determined. With a full press of the shutter release button 9, the process goes to step ST46. Otherwise, the process goes to step ST42.

In steps ST42 and ST43, live view processing and display are performed as in steps ST22 and ST23 shown in the flow chart of FIG. 9. As previously described, a live view display is produced at 30 frames per second.

In step ST44, whether or not the mode selection switch 14 is used for a power-off operation is determined. When the power-off operation is not performed, the process returns to step ST41.

In step ST45, a stop operation of the digital camera 1B such as actually turning off the power is performed.

In step ST46, raw data processed by the black level correction/white balance control part 211a is written into the DRAM 232 over the DMA channel 1.

In steps ST47 and ST48, live view processing and display are performed as in the above steps ST42 and ST43. At this time, however, the intervals between live view displays are made longer by controlling the TG 314 than in the case of normal live view display in the above steps ST42 and ST43. As indicated by operations Ra of FIG. 12, live view displays should preferably be produced at about 10 frames per second (frame dropouts), which is about one third in the case of normal live view display.

In step ST49, the steps of image processing are split into a plurality of parts and each split processing is performed. More specifically, as indicated by operations Rb of FIG. 12, split processing is cut in the intervals of the above live view processing and therefore split processing and live view processing are performed alternately. Thereby, time corresponding to 20 frames per second, the time being no longer needed in the above live view processing, can be spent in the image processing. These steps ST48 and ST49 allow a live view display to be produced from the instant immediately after raw data is written into the DRAM 232 in step ST46 (cf. an operation Rc of FIG. 12).

In step ST50, whether sequential execution of the above split processing completes all image processing or not is determined. When all the image processing is complete, the process goes to step ST51. Otherwise, the process returns to step ST47.

In step ST51, image compression by the JPEG section 212 and recording of image data on the memory card 8 through the memory card controller 214 are performed.

The operations described so far allow a live view display to be resumed immediately after raw data is written into the DRAM 232. This makes the time of not displaying a live view image in obtaining an image for recording shorter than before. Consequently, the convenience of a live view display is improved.

Fourth Preferred Embodiment

A digital camera 1C according to a fourth preferred embodiment of the present invention differs from the digital camera 1 of the first preferred embodiment both in program data stored in the flash ROM 232 and in a higher-capacity DRAM 232. Hereinafter, the operation of the digital camera 1C will be described.

<Operation of Digital Camera 1C>

Figure 13:
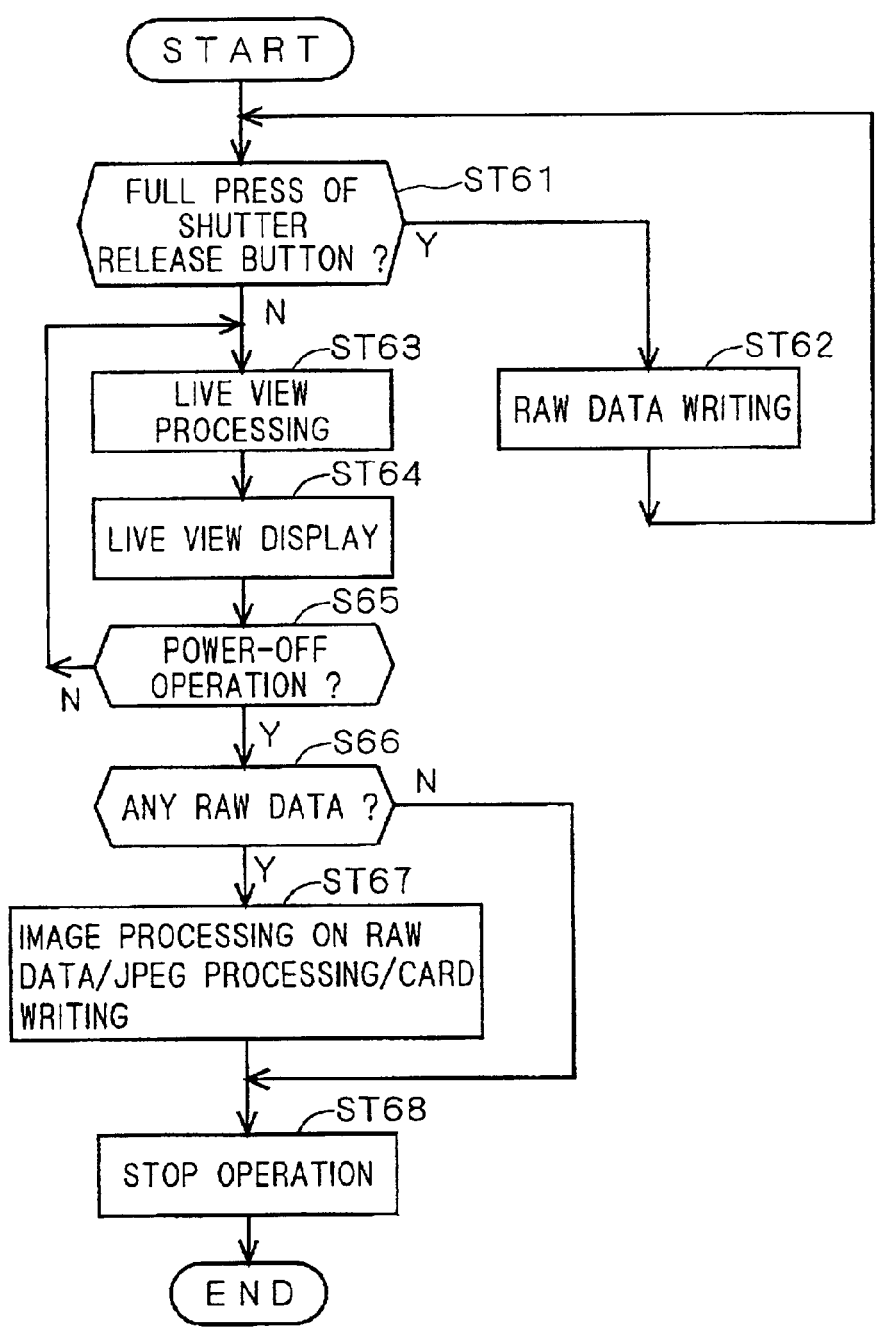
FIG. 13 is a flow chart of the operation of a digital camera 1C.
Figure 14:
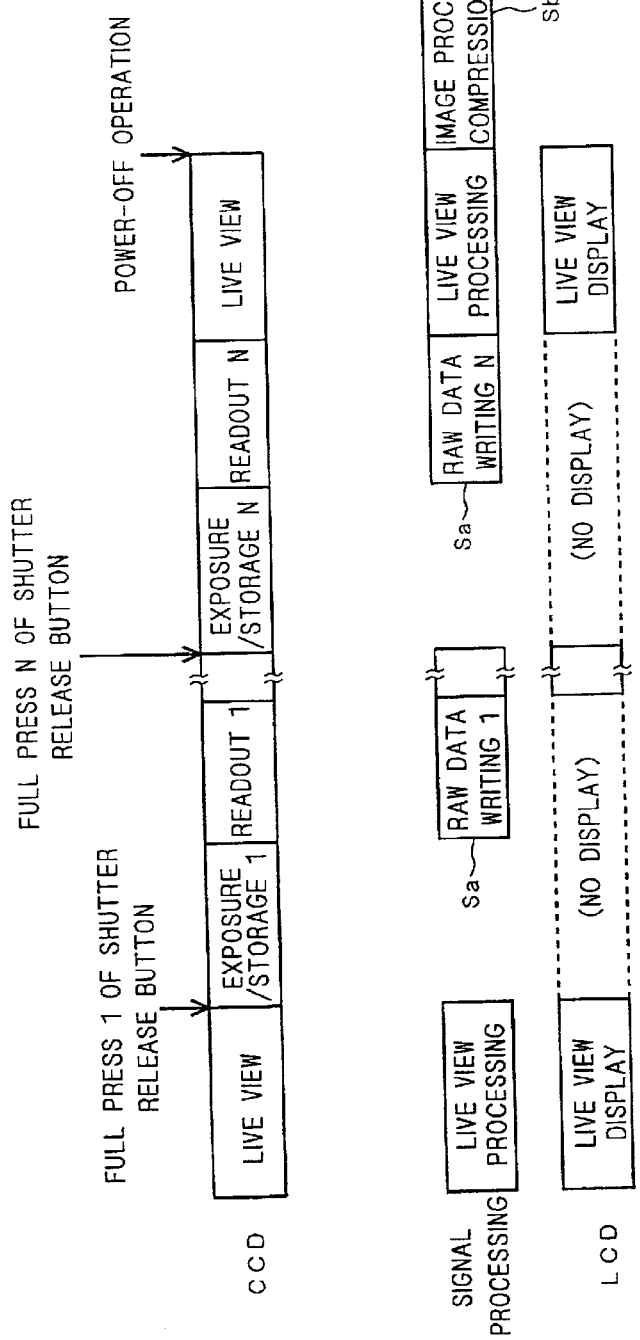
FIG. 14 shows an example of a sequence of operations of the digital camera 1C.
Figure 15:
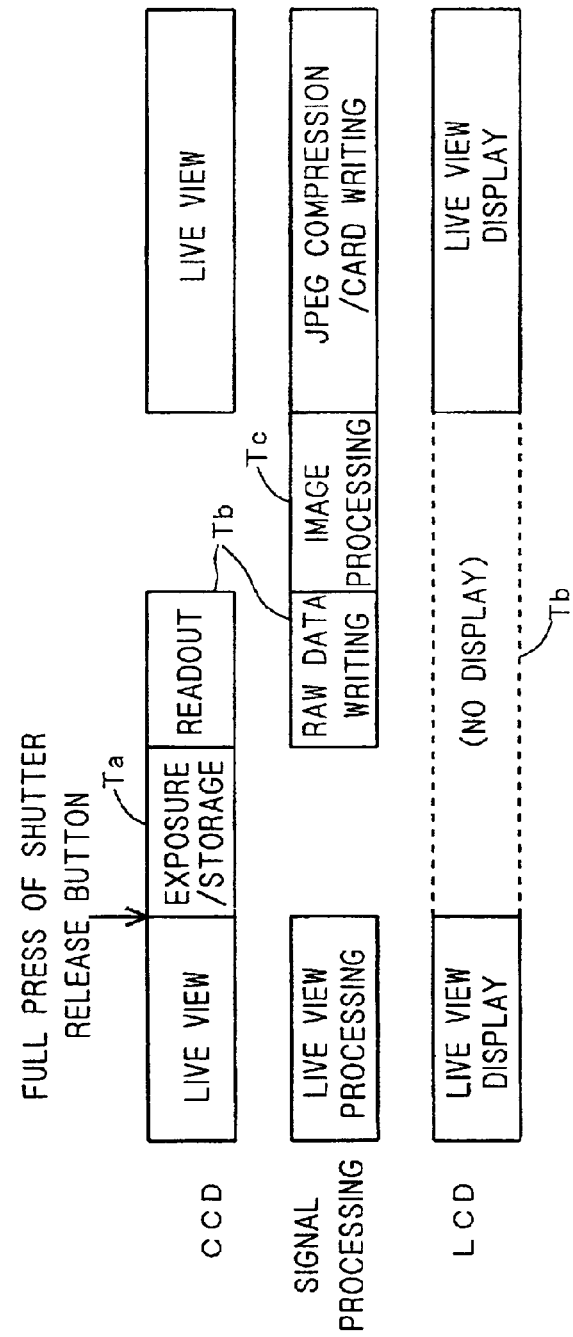
FIG. 15 shows an example of a sequence of operations of a conventional digital camera.

FIG. 13 is a flow chart of the operation of the digital camera 1C. FIG. 14 shows an example of a sequence of operations of the digital camera 1C.

In step ST61, whether the shutter release button 9 is fully pressed or not, i.e., an operation to acquire an image for recording is performed or not, is determined. With a full press of the shutter release button 9, the process goes to step ST62. Otherwise, the process goes to step ST63.

In step ST62, as indicated by operations Sa of FIG. 14, raw data processed by the black level correction/white balance control part 211a is written into the DRAM 232 over the DMA channel 1. Here, captured image data obtained for acquisition of an image for recording is sequentially accumulated in the DRAM 232 as raw data; therefore, the DRAM 232 of this preferred embodiment requires a larger storage capacity than in the first preferred embodiment.

In steps ST63 to ST65, live view processing and display, and a power-off operation are performed as in steps ST2 to ST4 shown in the flow chart of FIG. 7.

In step ST66, whether there is raw data stored in the DRAM 232 or not, i.e., an operation to acquire an image for recording is performed or not, is determined. With raw data, the process goes to step ST67.

In step ST67, all raw data stored in the DRAM 232 are subjected to image processing and JPEG compression, then written into the memory card 8 (cf. an operation Sb of FIG. 14).

In step ST68, a stop operation of the digital camera 1C such as actually turning off the power is performed.

The operations described so far allow a live view display to be resumed immediately after raw data is written into the DRAM 232. This makes the time of not displaying a live view image in obtaining an image for recording shorter than before. Consequently, the convenience of a live view display is improved.

While the invention has been shown and described in detail, the foregoing description is in all aspects illustrative and not restrictive. It is therefore understood that numerous modifications and variations can be devised without departing from the scope of the invention.

What is claimed is:

1. A digital camera comprising:
    an image sensor capable of selectively generating a first image signal and a second image signal;
    a memory for storing said second image signal;
    an image processor for performing first image processing on said first image signal and for performing second image processing, which is lower in priority than said first image processing, on said second image signal; and
    a timing controller for storing said second image signal generated by said image sensor into said memory at a first timed instant, for supplying said first image signal generated by said image sensor to said image processor at a second timed instant after said first timed instant, and for reading out and supplying said second image signal stored in said memory to said image processor at a third timed instant after said second timed instant.

2. The digital camera according to claim 1, wherein said second image signal is an image signal for recording.

3. The digital camera according to claim 2, wherein said second image signal is recorded on a memory card removable from said digital camera.

4. The digital camera according to claim 2, wherein said first image signal is an image signal for live view display.

5. The digital camera according to claim 1, comprising: as a viewfinder, only a display for displaying an image signal electrically.

6. The digital camera according to claim 1, wherein said first image signal is an image signal with a less amount of data than said second image signal.

7. The digital camera according to claim 6, further comprising:
    a driver for switching between a timing of generation of said second image signal and a timing of generation of said first image signal, both by said image sensor.

8. The digital camera according to claim 1, wherein said image processor includes a first image processor for performing common image processing on said first image signal and said second image signal, and a second image processor for performing predetermined image processing on only said second image signal.

9. The digital camera according to claim 8, wherein said timing controller supplies said second image signal, which has gone through said common image processing, to said second image processor and causes said second image processor to perform said predetermined image processing at a fourth timed instant after the completion of processing on said second image signal by said first image processor.

10. The digital camera according to claim 9, wherein said common image processing by said first image processor is filtering processing, and said predetermined image processing by said second image processor includes compression processing for recording.

11. The digital camera according to claim 10, wherein said filtering processing includes at least edge enhancement of an image signal.

12. The digital camera according to claim 9, wherein said timing controller stores said second image signal being processed by said second image processor into said memory at a fifth timed instant after said fourth timed instant, and reads out and supplies said second image signal being processed and stored in said memory, to said second image processor at a sixth timed instant after said fifth timed instant.

13. The digital camera according to claim 12, wherein said second image signal being processed is an image signal for which said compression processing for recording is completed.

14. The digital camera according to claim 12, wherein during generation of an advance second image signal and a subsequent second image signal respectively by an advance image capture and a subsequent image capture, said timing controller arbitrates between said first and third timed instants of access to said memory and said fifth and sixth timed instants of access to said memory.

15. The digital camera according to claim 1, further comprising:
an indicating member for indicating the start of image recording;
a detector for detecting the state of said indicating member; and
a priority controller for assigning priorities to said first image processing and said second image processing in said image processor on the basis of the result of detection by said detector.

16. The digital camera according to claim 15, wherein said indicating member is a two-position switch; and said priority controller gives high priority to said first image processing when said detector detects that said indicating member is pressed into its first position, and gives high priority to said second image processing when said detector detects that said indicating member is not in said first position.

17. The digital camera according to claim 1, wherein processing at said first to third timed instants is performed as said second image signal is generated.

18. The digital camera according to claim 1, wherein said timing controller interrupts processing on said second image signal by said image processor and supplies said first image signal to said image processor at a fourth timed instant after said third timed instant.

19. The digital camera according to claim 18, wherein said image processor performs processing on said first image signal and processing on said second image signal alternately until processing on said second image signal is completed.

20. The digital camera according to claim 18, wherein said first image signal is an image signal for live view display, arid said second image signal is an image signal for recording.

21. The digital camera according to claim 18, wherein said timing controller supplies said first image signal to said image processor about ten times per second.

22. The digital camera according to claim 1, wherein said memory has a storage capacity of a plurality of second image signals, and
said third timed instant is a timed instant of power-off.

23. A digital camera comprising:
an image sensor for generating an image signal;
a memory for storing an image signal generated by said image sensor;
a recorder for sequentially accumulating in said memory a plurality of image signals generated by a plurality of image captures, each image signal being generated by each image capture; and
an image processor for performing image processing for live view display on an image signal generated by said image sensor at a timed instant following the completion of storage of an image signal generated by each image capture into said memory, and for performing image processing on said plurality of image signals generated by a plurality of image captures and stored in said memory, in response to a power-off operation.

24. The digital camera according to claim 23, wherein said memory is nonvolatile memory.

25. A computer-readable recording medium on which a program is recorded, said program being installed in a microcomputer built in a digital camera to cause said digital camera to perform the following operations:
generating a first image signal;
storing said first image signal in memory at a first timed instant;
generating a second image signal;
performing first image processing on said second image signal at a second timed instant after said first timed instant; and
reading out said first image signal stored in said memory and performing second image processing which is lower in priority than said first image processing at a third timed instant after said second timed instant.

26. The recording medium according to claim 25, wherein said first image signal is an image signal for recording, and said second image signal is an image signal for live view display.

27. A computer-readable recording medium on which a program is recorded, said program being installed in a microcomputer built in a digital camera to cause said digital camera to perform the following operations:
generating an image signal with an image sensor;
storing an image signal generated by said image sensor in a memory;
performing image processing for live view display on an image signal generated by said image sensor at a timed instant following the completion of storage of an image signal generated by each image capture into said memory;
accumulating a plurality of image signals generated by a plurality of image captures in said memory; and
performing image processing on said plurality of image signals generated by a plurality of image captures and stored in said memory, in response to a power-off operation.

* * * * *

UNITED STATES PATENT AND TRADEMARK OFFICE
CERTIFICATE OF CORRECTION

PATENT NO. : 6,963,374 B2
DATED : November 8, 2005
INVENTOR(S) : Kenji Nakamura et al.

It is certified that error appears in the above-identified patent and that said Letters Patent is hereby corrected as shown below:

<u>Column 3,</u>
Line 8, delete "lens 301." and insert -- lens 301 disposed in lens barrel 3. --.

Signed and Sealed this

Third Day of January, 2006

JON W. DUDAS
*Director of the United States Patent and Trademark Office*